United States Patent [19]

Shipp

[11] Patent Number: 4,738,001

[45] Date of Patent: Apr. 19, 1988

[54] CANINE AND FELINE TOOTHBRUSH

[76] Inventor: Anthony D. Shipp, 351 N. Foothill Rd., Beverly Hills, Calif. 90210

[21] Appl. No.: 872,114

[22] Filed: Jun. 9, 1986

[51] Int. Cl.$^4$ .................................................. A46B 9/04
[52] U.S. Cl. .................................... 15/106; 15/167.1
[58] Field of Search ................. 15/106, 167 R, 167 A; D4/104, 105, 106

[56] References Cited

U.S. PATENT DOCUMENTS

| D. 49,472 | 8/1916 | Dierke | D4/105 |
| D. 56,858 | 1/1921 | Cahill | D4/105 |
| D. 139,264 | 10/1944 | Littig | D4/105 |
| D. 160,919 | 11/1950 | Brooks | D4/105 |
| D. 273,635 | 5/1984 | Stocchi | D4/104 |
| 2,161,349 | 6/1939 | Hadden | 15/106 X |
| 3,754,295 | 8/1973 | Hyman | 15/167 |
| 4,031,587 | 6/1977 | Dietrich | 15/167 R |
| 4,150,457 | 4/1979 | Larson | 15/167 |
| 4,185,349 | 1/1980 | Papas | 15/167 |
| 4,524,478 | 6/1985 | Ross | 15/167 |

FOREIGN PATENT DOCUMENTS

| 532191 | 1/1922 | France | 15/167 R |
| 2502918 | 10/1982 | France | 15/167 R |

OTHER PUBLICATIONS

Dr. Colin E. Harvey, "Most Common Small Animal Disease Countered with Preventive Dentistry", DVM, Apr., 1986.
"Your Animal Friend", Summer, 1986, (Flyer).
"There's More to Life than People", Cerritos College, Dental Hygiene (Pamplet), 1981.
"Dog-O-Dontics" Advertisement, SCVMA Journal, Pulsi, 1986.
"Is Dental Hygiene Just for People?", by Jo Engle Wilson, Sandy McCandliss Kravitz, and Barbara Powers, SCDHA Journal, Summer 1984.
"Dental Care: an Important Safeguard for a Dog's Health", vol. 85, Issue 3.
"AVDS Newsletter", Spring 1985.
"Dental Problems in Animals".
"Canine Dentistry", Symposium and Compendium—Jan. 1984.

*Primary Examiner*—Peter Feldman
*Attorney, Agent, or Firm*—Lyon & Lyon

[57] ABSTRACT

This application relates generally to animal tooth brushes specifically designed for cleaning the teeth of animals whose teeth and mouth shape is different from human, and whose gums are more sensitive. This will enable pet owners a means of offering oral hygiene which will aid in the prevention of periodontal and related diseases and the reduction of halitosis.

The toothbrush comprises an elongated handle securing brush heads which have a plurality of bristle tufts. The heads and the tufts attached thereto taper vertically and horizontally to easily fit and reach the inner reaches of a pet's mouth. Individual bristles make up each tuft which have a diameter of in the range of 0.0025 to 0.005 to accommodate the sensitive nature of pet's gums as compared to those of humans. The tufts are arranged in columns increasing in length toward the handle to form a trapezoidal or tapered bristle surface which aids in preventing slippage from the pet's teeth into the gums, as well as fit the shape of the animal mouth.

16 Claims, 1 Drawing Sheet

U.S. Patent    Apr. 19, 1988    4,738,001
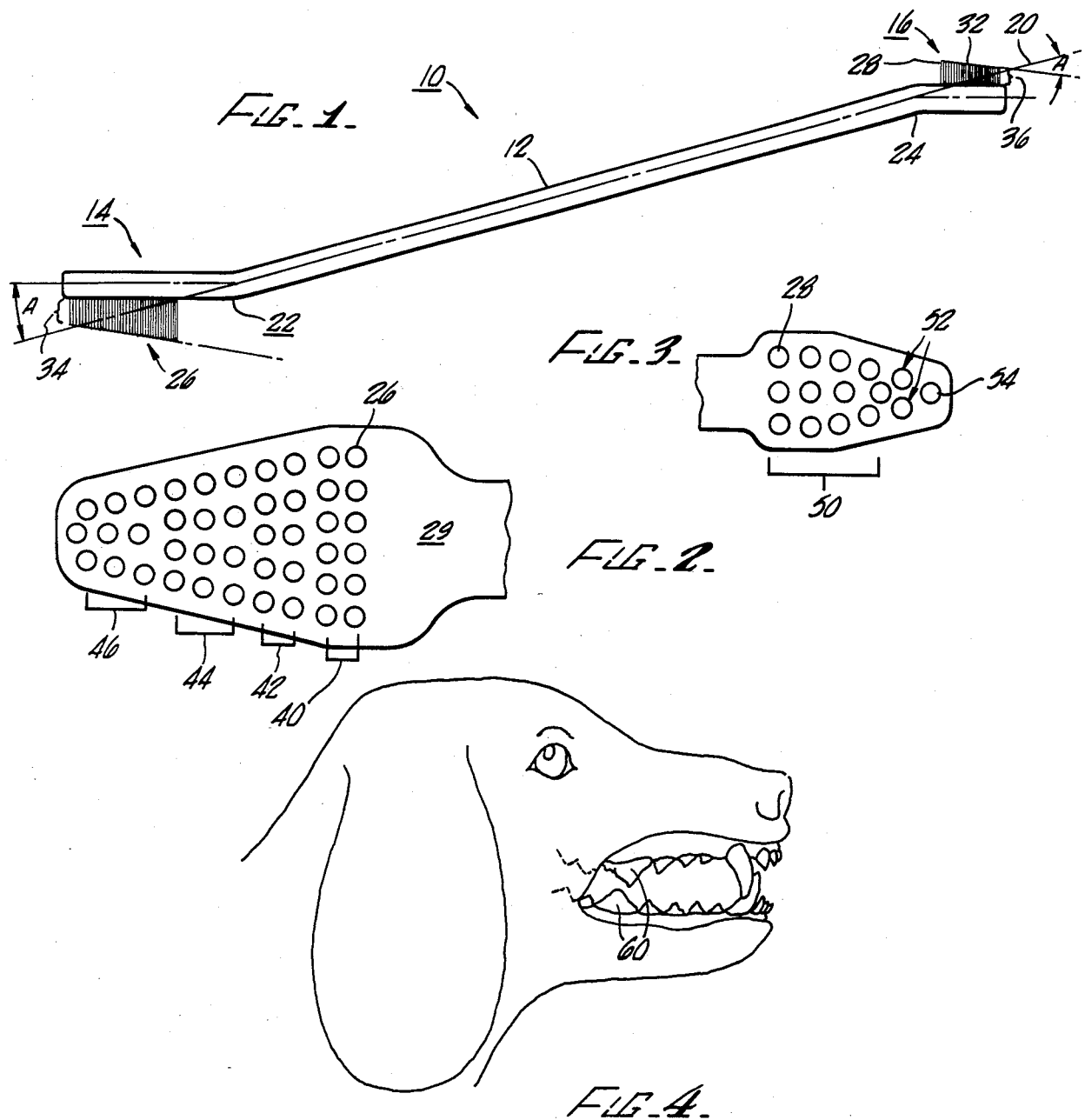
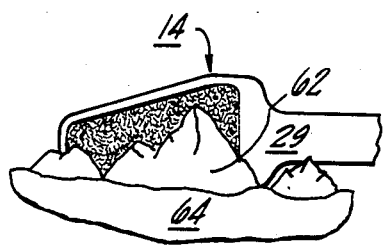
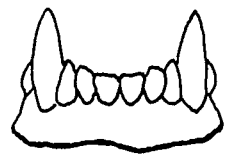

CANINE AND FELINE TOOTHBRUSH

BACKGROUND OF THE INVENTION

The invention relates generally to canine and feline dental health care products, and more particularly, to a toothbrush specifically designed for use with dogs and cats to provide for the cleaning of teeth, the prevention of periodontal and related diseases, and the reduction of halitosis. The invention, of course can also be used on other animals whose tooth structure is similar to cats and dogs.

Conventional methods of cleaning the teeth of dogs and cats by the pet owner have included chew toys, typically made of leather or rawhide strips, and biscuits, which when chewed purport to exhibit a cleaning effect on the animal's teeth. Other methods have included applying an abrasive powder to a gauze which is wrapped about the finger and applied directly to the animal's teeth. Cat and dog teeth can also be professionally cleaned by a veterinarian employing a method of ultrasonic scaling which involves anesthetizing the animal before performing the cleaning operation. Human toothbrushes have also been used to brush the teeth of dogs and cats, but as will be discussed in later sections, and do not lead themselves well for this purpose.

All of the above-described prior art methods have exhibited major drawbacks. Chew toys and biscuits have proven ineffective against the tartar build-up which leads to periodontal disease. The gauze and powder cleaning technique is difficult and ineffective in many respects since areas between teeth are not cleaned and other teeth are not reached at all, not to mention the fact that the owner is often place at risk of being bitten by the pet during application. Further, the gauze and powder process is impractical for the cleaning of cat teeth due to the limited access to the mouth area. Ultrasonic scaling by a veterinarian, while effective, is expensive, and extremely unsafe for use with older animals due to the risk of death associated with anesthesia.

Cleaning of a pet's teeth is very important because unclean teeth are primarily responsible for the most common disease encountered in small animal veterinary practice, periodontal disease, a term used to describe diseases of the tooth attachment apparatus, the gums, tooth roots, bone surrounding the teeth, and the periodontal ligament tissue joining tooth to bone. Symptoms range from gum inflamation (gingivitis), formation of plaque (food and bacteria) and bad breath, to serious accumulation of tartar (mineralized plaque), bleeding, receded or eroded gums, loose or infected teeth, and eventual loss of teeth. Periodontal disease is also the major cause of bad breath in dogs and cats.

The inadequacies of conventional canine and feline teeth cleaning methods are manifest, and evidenced by the fact that 95% of dogs aged five years or more exhibit symptoms of periodontal disease caused primarily by tartar build-up. If untreated, periodontal disease (periodontitis) often leads to severe damage of major organ systems which can shorten the animal's life. Moreover, in older animals, periodontal disease is difficult to treat in view of the previously referred-to risk associated with anaesthetizing the animal attendant to ultrasonic scaling. Moreover, human toothbrushes are not ideally suited to the prophylactic cleaning of cat and dog teeth. This is due in part to the generally untapered shape of the heads and bristles, short and awkward shape and configuration of the handle and head the generally firmer and harder bristles which are not ideally compatible with the higher sensitivity of the gums in cats and dogs as compared with those of human beings.

Also, the teeth of cats and dogs are shaped differently than those of human beings which necessitates features and characteristics not present in toothbrushes designed for humans. The mouths of many cats and dogs are of a drastically different relative shape and the teeth of dogs and cats, especially those in the back, are not so closely spaced as human teeth. Thus, due to the differing sensitivity of the gums and configuration of the mouth, human toothbrushes are not deemed suitable for use with dogs and cats. The stiffness of the bristles may injure the animal's gums and the shape of the brush is generally such that is tends to slide down the animal's teeth thus lessening the cleaning action of the toothbrush. Another notable inadequacy of the human toothbrush in cat and dog dental prophylactic applications is that the angle of the head relative to the brush handle is designed to accommodate the fact that human beings brush their own teeth. Because dogs and cats obviously cannot do the same, the handle of the toothbrush of the present invention employs a reverse angle to facilitate brushing by a human being. The handle is also elongated to maintain the owner's hand at a safe distance from the animal's mouth, thereby minimizing the probability of being bitten.

Finally, while human teeth are generally closely spaced, only the front teeth of cats and dogs are similarly spaced. Also, the difference in size between the back and front teeth of cats and dogs is generally far greater than that of humans. Because of these differences, a single configuration of bristles as exhibited by most human toothbrushes is generally regarded as inadequate for the dental prophylactic needs of animals.

Thus, an object of the present invention is to provide a toothbrush for cleaning the teeth of cats and dogs which is inexpensive, effective in the removal of plaque from the animal's mouth, safe and comfortable to both the animal and user in operation, and easy to use. A further object of the present invention is to provide a toothbrush for cats and dogs which minimizes pain associated with the bristles coming into contact with the animal's gums, and which is contoured in comformity with the shape of the animal's teeth and mouth, while still providing for efficient removal of plague from the teeth of the animal thus inhibiting the onset of periodontal disease. A still more particular object of the invention is to provide a toothbrush for dogs and cats with two brush heads one large and one small, capable of being used for both front and back teeth, where the bristle surfaces on the brush heads are angled in conformity with the shape of the animal's teeth, the bristles are soft to prevent gum damage, and the brush heads are angled to enable efficient use by the pet owner or other user. The unique shape and soft bristles allow for well-tolerated brushing of even the most sensitive pet gums.

SUMMARY OF THE INVENTION

To achieve the foregoing objects, the invention, in its best mode, provides a toothbrush comprising an elongated handle including a longitudinal axis, and a pair of brush heads extending in substantially parallel planes, the brush heads including bristle tufts respectively secured thereto. Each of the brush heads extends at an angle with respect to the longitudinal axis so that both of the bristle surfaces generally extend outwardly away from the intermediate portion of the handle forming an obtuse angle therewith, whereby the angles formed by the bristle surfaces aid the user in placement of the bristle surfaces in connection with the animal's teeth.

The handle and brush heads are preferably integrally molded in one piece. Each of the brush heads is preferably generally trapezoidal in shape, tapering at the end which makes the farthest extension into the animal's mouth. One brush head is considerably larger than the other and can be used for brushing the larger back teeth, whereas, the small or brush head is for cleaning front teeth, or in the case of cats and small dogs, all the teeth. Each brush head is comprised of a plurality of bristle tufts forming a grid, comprised of approximately 20 bristles in each tuft. Typically, the bristle tufts are arranged in rows with the number of tufts per row decreasing toward the end of the brush thus conforming with the desired trapezoidal or tapering configuration of the bristle head. The fact that the brush is wider (and has more tufts) in the back than in the front is important since it assists in preventing the brush from sliding off the tooth and into the gum as brushing is performed. Bristle tufts are secured to the ends of the brush and preferably such tufts gradually increase in length from a minimum at the end of each brush to a maximum nearest the handle. In other words the shape of the head of the brush (including the bristles) is tapered both vertically, and horizontally, to better fit into the far recesses of an animal's mouth. In the best mode of the invention, individual bristles are synthetic, preferably nylon, approximately 0.003 inches in diameter to ensure softness when in accidental contact with the animal's gums. These bristles are at least four times softer than the typical child's toothbrush which has synthetic (usually nylon) bristles in the range of 0.007 inches and substantially softer than the typical adult toothbrush which has bristles in the range of 0.008 to 0.010 inches.

Other features and advantages of the embodiments of the invention will become known by reference to the following general description, the appended claims and the drawings.

BRIEF DESCRIPTION OF THE DRAWINGS

FIG. 1 is a side plan view of the toothbrush embodying various features of the invention.

FIG. 2 is a front plan view showing the larger of the bristle heads.

FIG. 3 is a front plan view showing the smaller of the bristle heads.

FIG. 4 is a side plan view of a dog's head emphasizing the configuration of the jaw and teeth.

FIG. 5 is a side plane view showing the larger of the bristle heads in a position of contemplated use in connection with canine molars.

FIG. 6 is a front plane view of dog's lower dental arcade showing the canines and incisors.

GENERAL DESCRIPTION OF THE PREFERRED EMBODIMENT

Referring more particularly to the drawings, FIG. 1 shows a toothbrush 10, comprised of an elongate handle 12, a larger brush head 14 and a smaller brush head 16 secured at opposite ends thereto. The handle has a longitudinal axis 20 and includes two angled neck portions 22 and 24 respectively, extending from opposite ends of the handle 12. In order to provide easy access to, and efficient cleaning of the animal's teeth by the user, in the best mode of the invention, the brush heads, 14 and 16 preferably extend at angles of approximately 15 degrees with respect to the longitudinal axis 20. Angles, A and $A^1$ of approximately 15 degrees provide the easiest access to the entirety of the animal's teeth by the user while providing efficient cleaning. Each of the brush heads 14 and 16 include bristle tufts, 26 and 28 respectively, are respectively secured to the neck portions, 22 and 24, and form bristle surfaces, 30 and 32 respectively. The bristles are respectively secured to the neck portions 22 and 24 such that both bristle surfaces 30 and 32 extend generally outwardly away from the intermediate portion of the handle 12. Each brush head 14 and 16 preferably includes a plurality of bristle tufts 26 and 28 which are secured within holes. The bristles gradually increase in length from a minimum at the ends of the bristle surface 34 and 36 to a maximum at the area nearest the handle 12. In the best mode, the larger head (without bristles) measures approximately 0.2 inches in thickness and tapers from about 0.725 inches to about 0.325; while the small head tapers from about 0.375 to 0.162 inches and has the same 0.2 inch thickness. In the best mode, the longer bristles in the large head measure approximately 16/32 inches and taper to approximately 10/32 inches, while the longer bristles in the small head measure approximately 10/32 inches and taper to approximately 6/32 inches. Each tuft 26 and 28 is comprised of approximately 20 individual synthetic bristles, each bristle having a diameter in the best mode, of approximately 0.003 inches (as opposed to approximately 0.007 to 0.010 inch diameter of human toothbrushes).

As shown in FIGS. 2 and 3, the brush heads 14 and 16 each contain several rows of bristle tufts 26 (in the larger head) and 28 (in the smaller head). The number of bristle tufts in each row is gradually decreasing from the row nearest the handle 12 to the respective ends 34 and 36 of the bristle surface 30 and 32. Thus, the respective bristle surfaces 30 and 32 have generally trapezoidal or tapered configuration which has been found to be particularly beneficial in preventing the brush from slipping off the animal's molars and premolars and striking the gums. This effect is achieved since the largest teeth will typically protrude no more than the width of the brush.

In the preferred mode, the larger brush head 14 (FIG. 2) will have 43 tufts arranged approximately in ten columns of bristle tufts 26 comprised of (proceeding outwardly from the handle) two columns of six tufts 40, two columns of five tufts 42, three columns of four tufts 44 and three columns (slightly bowed) of 3 tufts 46. The smaller brush head 16 (FIG. 3) will have 15 tufts arranged approximately in six columns comprised of four columns of three tufts 50 (the last slightly bowed), one column of two tufts 52 and one single tuft 54.

FIGS. 4, 5 and 6 picture the configuration of a typical dog's teeth and jaw and show the toothbrush in operation. FIG. 4 shows the head of a dog with particular emphasis of the dog's teeth. In operation, when the molars and premolars 60 are brushed, the operator will insert the brush from the side of the dog's jaw and will brush the sides and top of the teeth with a horizontal motion. This is shown more particularly in FIG. 5 where the larger end of the toothbrush 14, is contacting a dog's mandibular molar 62. The greater width at the base of the bristle head 29, prevents the brush from slipping down the tooth 62 and striking the dog's gums 64. FIG. 6 shows the front lower portion of the dog's jaw. This area is intended to be cleaned by the smaller brush head 16 (FIG. 1) since the larger brush head 14 (FIG. 1) would be too large to fit in the small area and be more likely to contact the dog's gums and cause discomfort. Accordingly, the overall bristle length of the smaller brush head 14 (FIG. 1) would be smaller than that of the larger brush head 16 (FIG. 1) in order to more efficiently clean the teeth in this smaller part of the mouth.

Thus, it should now be readily apparent that all the surfaces of a dog's or cat's teeth can be efficiently be cleaned by using one or the other of the brush heads 14 and 16 of the present invention.

It is to be understood that the invention is not confined to the particular construction and arrangement of parts herein illustrated and described, but is intended to embrace all such modified forms thereof which come within the scope of the claims.

What is claimed is:

1. A toothbrush for cleaning the teeth of dogs or cats comprising:
    (a) an elongated handle having a longitudinal axis;
    (b) a larger brush head and a smaller brush head secured to the opposite ends of said handle, reverse to one another, and extending in planes substantially parallel to the longitudinal axis, each brush head having a plurality of bristle tufts respectively secured thereto forming a bristle surface;
    (c) both the larger and smaller brush heads tapering vertically in a first dimension parallel to the bristles, and horizontally, in a second dimension perpendicular to the bristles to easily fit and reach the inner recesses of a dog or cat's mouth;
    (d) individual bristles make up said bristle tufts, said individual bristles having a diameter in the range of 0.0025 to 0.005 inches.

2. A toothbrush as claimed in claim 1 wherein said larger and smaller brush heads extend at an angle with respect to said longitudinal axis such that both of said bristle surfaces generally extend outwardly away from said handle at a approximate 15° angle from the longitudinal axis, whereby said brush heads can be effectively utilized to remove plaque from the surface of the teeth of dogs or cats.

3. A toothbrush as claimed in claim 1 wherein said bristle tufts are arranged in columns on said brush heads, the number of tufts per column increasing toward said handle to form a trapezoidal or tapered bristle surface.

4. A toothbrush as claimed in claim 1 wherein said bristle tufts generally increase in length from a minimum at a point farthest from the handle to a maximum at a point nearest the handle.

5. A toothbrush for brushing the teeth of animals comprising:
    (a) a long and narrow handle with a longitudinal axis;
    (b) a pair of neck portions secured to the opposite ends of the handle;
    (c) a pair of brush heads respectively secured to the distal ends of said neck portions and aligned reverse to one another and having bristle tufts attached thereto;
    (d) said brush heads tapering both vertically in a first dimension parallel to the bristles and horizontally in a second dimension perpendicular to the bristles defining wider proxiate ends and narrower distal ends to better reach the back of an animal's mouth;

6. The toothbrush of claim 5 wherein said bristle tufts being arranged on the heads so that more are placed on the wider proximate ends near the neck portions than in the narrower distal ends to aid in preventing the brush from sliding off the teeth and into the gums.

7. The toothbrush in claim 5 wherein said neck portions form surfaces extending substantially parallel to one another and at an approximately 15° reverse angle to the longitudinal axis, to facilitate getting each toothbrush head in the animal's mouth.

8. The toothbrush in claim 6 wherein said bristle tufts have nylon bristles in the range of 0.0025 to 0.005 inches in diameter.

9. The toothbrush in claim 7 wherein one of the heads holds forty-five tufts of nylong bristles arranged in two columns of six, two columns of five, three columns of four and three columns of three, and the second head comprised of fifteen tufts arranged in four columns of three, one column of two and one column of one.

10. A toothbrush for brushing the teeth of animals comprising:
    (a) a long and narrow handle with a longitudinal axis;
    (b) a pair of neck portions secured to the distal ends of the handle;
    (c) a pair of brush heads, one large and one small, respectively, secured at opposite ends to said neck portions and aligned reverse to one another having bristle tufts attached thereto;
    (d) said brush heads forming a taper and said bristle tufts also forming a taper so that the brush heads and bristles narrow from wider proximate ends to narrower distal ends for easy insertion into the back of an animal's mouth;
    (e) said bristle tufts being arranged on the heads so that more are placed on the wider proximate ends near the neck portions than in the narrower distal ends to aid in preventing the brush heads from sliding off the teeth and into the gum.

11. The toothbrush of claim 10 wherein said neck portions form surfaces extending substantially parallel to one another and at an approximately 15° reverse angle to the longitudinal axis, to facilitate getting each head in the animal's mouth.

12. The toothbrush of claim 10 wherein said bristle tufts have bristles in the range of 0.0025 to 0.005 inches in diameter.

13. The toothbrush of claim 12 wherein said bristles are made of nylon.

14. The toothbrush in claim 13 wherein one of the heads holds forty-five tufts of nylon bristles arranged in two columns of six, two columns of five, three columns of four and three columns of three, and the second head comprised of fifteen tufts arranged in four columns of three, one column of two and one column of one.

15. A toothbrush for brushing the teeth of animals comprising:
    (a) a long and narrow handle with a longitudinal axis;
    (b) a pair of neck portions secured to the distal ends of the handle;
    (c) said neck portions forming surfaces extending substantially parallel to one another and at an approximately 15° reverse angle to the longitudinal axis, to facilitate getting each head in the animal's mouth;
    (d) a pair of brush heads one large and one small respectively secured at opposite ends to said neck portions and aligned reverse to one another having bristle tufts attached thereto;
    (e) said brush heads tapering both vertically in a first dimension parallel to the bristles and horizontally in a second dimension perpendicular to the bristles defining wider proximate ends and narrower distal ends to better reach the back of an animal's mouth;

(f) said bristle tufts being arranged on the heads so that more are placed on the wider back end near the neck portions than in the front to aid in preventing the brush heads from sliding off the teeth and into the gum.

(g) said tufts having bristles less than 0.006 in diameter.

16. The toothbrush in claim 13 wherein one of the heads holds forty-five tufts of nylong bristles arranged in two columns of six, two columns of five, three columns of four and three columns of three, and the second head comprised of fifteen tufts arranged in four columns of three, one column of two and one column of one.

* * * * *